W. G. COX.
BRACKET FOR AUTOMOBILE BUMPERS.
APPLICATION FILED MAY 20, 1921.

1,386,845.

Patented Aug. 9, 1921.

Inventor
W. G. Cox
By
Attorneys

UNITED STATES PATENT OFFICE.

WILLIAM G. COX, OF CLEVELAND, OHIO, ASSIGNOR TO COX BRASS MANUFACTURING COMPANY, OF ALBANY, NEW YORK, A CORPORATION OF NEW YORK.

BRACKET FOR AUTOMOBILE-BUMPERS.

1,386,845.  Specification of Letters Patent.  Patented Aug. 9, 1921.

Application filed May 20, 1921. Serial No. 471,164.

*To all whom it may concern:*

Be it known that I, WILLIAM G. COX, a citizen of the United States, residing at Cleveland, in the county of Cuyahoga and State of Ohio, have invented certain new and useful Improvements in Brackets for Automobile-Bumpers, of which the following is a specification.

My primary object is to provide a simple and effective bracket adapted to facilitate the attachment of a spring bar bumper to an automobile frame, the bracket being particularly constructed to permit straight alinement thereof with the frame part to which it is to be attached and to clamp the bar in an advantageous thrust position opposite a twisted portion and a right-angled bend in the bracket. The bracket is also provided with a depending clamping extremity adapted to co-act with a separate angular clamping piece to facilitate adjustments and to permit bars of different width and thickness to be securely clamped in the same bracket.

Figure 1:
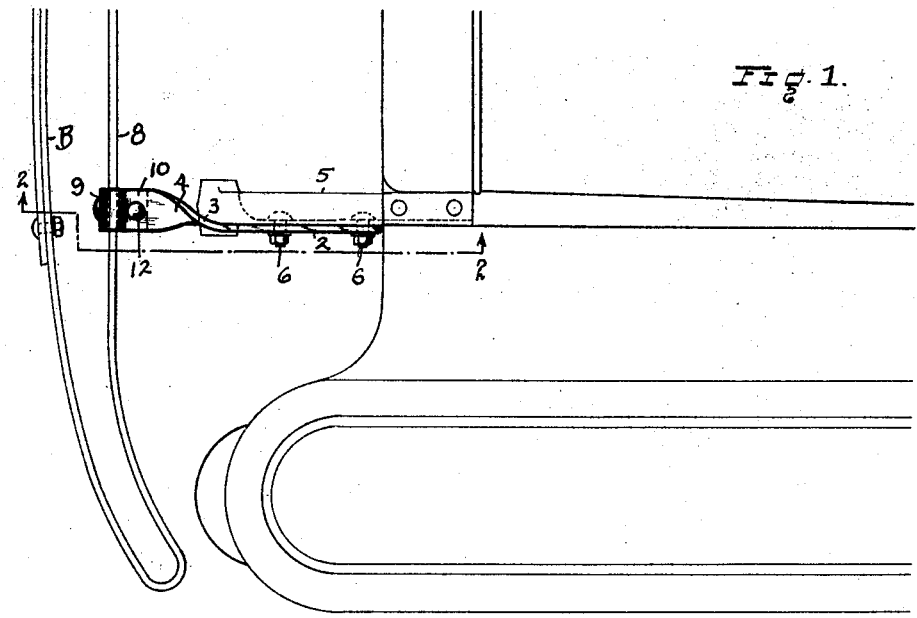
Figure 2:
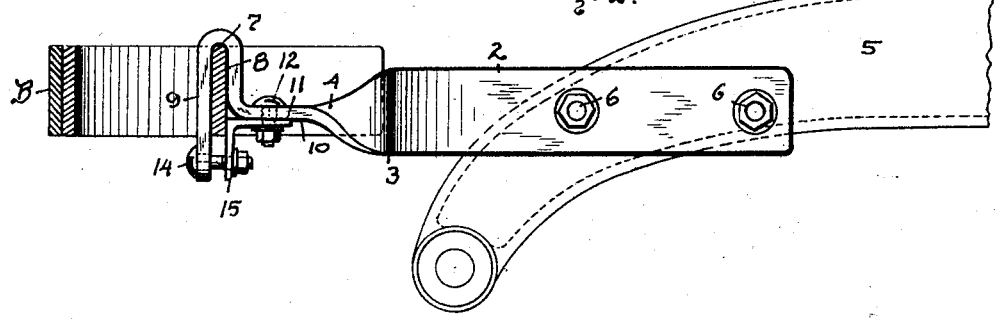
Figure 3:
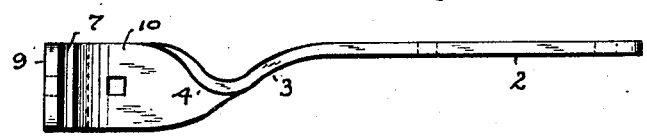
Figure 4:
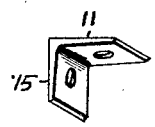

In the drawing accompanying this application, Figure 1 is a plan view of a portion of an automobile and a bumper fixed thereto by one of my improved brackets. Fig. 2 is an enlarged side view of my bracket attached to the spring-suspension portion of a chassis frame and showing a bumper in cross section on line 2—2 of Fig. 1, supported thereon. Fig. 3 is a plan or top view of the main bracket member, and Fig. 4 is a perspective view of the separate angle piece used as a clamping extension for the bracket.

The invention comprises a relatively heavy flat bar 2 of metal which is straight for the greater portion of its length but also possessing a lateral bend 3 on curved lines merging with a twisted bend 4 which places the flat sides of the front and rear portions of the bar at right angles and in offset relation laterally viewed from the top as shown in Fig. 3. The straight attachment end of the bar is adapted to be secured edge upright to one side of the chassis frame extension 5, either by bolts 6 as shown, or by clips or other means, and the twisted front end portion of the bar extends forwardly on a straight horizontal line for a short distance and thence upwardly at right angles before being bent reversely and downwardly to provide a vertical slot or recess 7 which is open at its bottom side to receive the flat supporting bar 8 of a bumper B. The reversely bent portion 9 extends downwardly for a considerable distance beneath the horizontal flat connecting portion 10 of the bracket bar 2 and provides a relatively long spring lip or tongue which is adapted to be flexed inwardly to clamp the bumper bar 8 within the slot or recess 7, and to effect a rigid clamping action on bumper bars of different width a separate metal angle piece 11 is seated upon the bottom side of flat connecting portion 10 of the bracket and fastened thereto by a bolt and nut 12, while a second clamping bolt and nut 14 serves to unite and draw the extremity of tongue 9 and the vertical flange 15 of angle piece 11 together. In this way it is feasible to clamp bumper bars of different widths and thicknesses very rigidly in place within bracket 2 so that the thrust of the bumper will be placed directly opposite the twisted connecting portion or neck of the bracket and which twist in the bracket braces and gives strength thereto. The vertical flange 15 of clamping member 11 serves in a sense to extend the seat and length of the slot or recess for the bumper bar, and the bar may rest on the clamping bolt 14 but is preferably raised and apart therefrom to effect a powerful clamping action at the corner of clamping piece 11.

What I claim is:

1. A bracket for automobile bumpers, comprising a flat bar having a reversely bent extremity providing a seating slot and a spring clamping tongue for a bumper bar, and separate clamping means associated with said tongue and bar adapted to secure the bumper bar removably upon said bracket.

2. A bracket for automobile bumpers, comprising a flat bar having a twist therein and bent reversely at one end to provide a clamping seat and tongue, and clamping means associated with said tongue and bar adapted to clamp a bumper upon said bracket.

3. A bracket for automobile bumpers, comprising a flat bar having a lateral bend and a twisted portion and bent in reverse directions at one end to provide a clamping seat and a spring tongue for a bumper bar, and an angular clamping member and clamping bolts connected with said bar and tongue.

4. A bracket for automobile bumpers, comprising a twisted bar having a transverse seat and a reversely bent extremity providing a spring tongue depending beneath said seat, a separate angular clamping piece affixed to said seat opposite the depending extremity of said tongue, and a clamping bolt connecting said tongue and clamping piece.

5. A bracket for automobile bumpers, comprising a flat bar having one end portion twisted at right angles to the plane side of its opposite end and bent upwardly and downwardly at the front end of its twisted portion to provide a relatively long tongue and a recess at the base of said tongue, a right-angled clamping member affixed to said twisted portion of the bracket and extending downwardly parallel into the free end of said tongue, and a clamping bolt uniting said tongue and member.

WILLIAM G. COX.